United States Patent
Kim et al.

(12) 
(10) Patent No.: US 9,306,205 B2
(45) Date of Patent: Apr. 5, 2016

(54) RECHARGEABLE BATTERY HAVING SAFETY MEMBER

(71) Applicant: SAMSUNG SDI CO., LTD., Yongin-si, Gyeonggi-do (KR)

(72) Inventors: Seung-Mo Kim, Yongin-si (KR); Bong-Kyoung Park, Yongin-si (KR); Hyun Soh, Yongin-si (KR); Byung-Sub Park, Yongin-si (KR); Naum Feygenson, Yongin-si (KR); Chan-Ho Lee, Yongin-si (KR); Hyun-Chul Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 164 days.

(21) Appl. No.: 14/252,628

(22) Filed: Apr. 14, 2014

(65) Prior Publication Data

US 2015/0079431 A1 Mar. 19, 2015

(30) Foreign Application Priority Data

Sep. 17, 2013 (KR) ........................ 10-2013-0112116

(51) Int. Cl.
| | |
|---|---|
| *H01M 2/34* | (2006.01) |
| *H01M 2/22* | (2006.01) |
| *H01M 2/26* | (2006.01) |
| *H01M 10/04* | (2006.01) |

(52) U.S. Cl.
CPC ........ *H01M 2/34* (2013.01); *H01M 2/22* (2013.01); *H01M 2/26* (2013.01); *H01M 2/263* (2013.01); *H01M 10/0431* (2013.01); *H01M 2200/103* (2013.01)

(58) Field of Classification Search
CPC ............... H01M 10/0431; H01M 2200/103; H01M 2/22; H01M 2/26; H01M 2/263; H01M 2/34

See application file for complete search history.

(56) References Cited

U.S. PATENT DOCUMENTS

| | | | | |
|---|---|---|---|---|
| 6,377,432 | B1 * | 4/2002 | Hashimoto | ............ H01H 85/36 361/103 |
| 2007/0099073 | A1 * | 5/2007 | White | ................. H01M 2/1055 429/158 |
| 2011/0136004 | A1 * | 6/2011 | Kwak | .................... H01M 2/024 429/186 |
| 2012/0196166 | A1 | 8/2012 | Kim | |
| 2012/0263976 | A1 | 10/2012 | Byun et al. | |
| 2013/0149570 | A1 * | 6/2013 | Han | ....................... H01M 2/347 429/61 |
| 2013/0295416 | A1 * | 11/2013 | Guen | ................ H01M 10/4257 429/7 |
| 2014/0255737 | A1 * | 9/2014 | Moon | ................... H01M 2/348 429/62 |

FOREIGN PATENT DOCUMENTS

| | | |
|---|---|---|
| KR | 10-2012-0086835 A | 8/2012 |
| KR | 10-2012-0118315 A | 10/2012 |

\* cited by examiner

*Primary Examiner* — Carlos Barcena
(74) *Attorney, Agent, or Firm* — Lewis Roca Rothgerber Christie LLP

(57) ABSTRACT

A rechargeable battery according includes a plurality of electrode assemblies including a first electrode assembly and a second electrode assembly, a case housing the plurality of electrode assemblies, a cap assembly coupled to the case, and a first safety member including a first conductive plate between the first electrode assembly and the case, a second conductive plate between the second electrode assembly and the case, and a safety fuse between the first conductive plate and the second conductive plate and coupling the first and second conductive plates together.

18 Claims, 6 Drawing Sheets

RECHARGEABLE BATTERY HAVING SAFETY MEMBER

CROSS-REFERENCE TO RELATED APPLICATION

This application claims priority to and the benefit of Korean Patent Application No. 10-2013-0112116 filed in the Korean Intellectual Property Office on Sep. 17, 2013, the entire contents of which are incorporated herein by reference.

BACKGROUND

1. Field

An aspect of the present invention relates generally to a rechargeable battery.

2. Description of the Related Art

A rechargeable battery differs from a primary battery in that it can be repeatedly recharged and discharged, while a primary battery is incapable of being recharged.

Low-capacity rechargeable batteries are often used in small portable electronic devices such as mobile phones, notebook computers, and camcorders, while high-capacity rechargeable batteries are widely used as a power source for larger electric devices, such as driving a motor of a hybrid vehicle, etc. Recently, high power rechargeable batteries using a non-aqueous electrolyte and having high energy density have been developed, and these high power rechargeable batteries are formed by coupling a plurality of rechargeable batteries in series for use as a power source for driving a motor of a device requiring a large amount of electric power, for example, an electric vehicle, etc. High-capacity rechargeable battery modules normally include a plurality of rechargeable batteries connected in series, where each of these rechargeable batteries may be a cylindrical or prismatic shape.

In situations where foreign conductive materials such as nails, metal tools like awls, or other similar conductive materials enter a rechargeable battery cell, a short circuit may occur inside the rechargeable battery as a result. When the short circuit occurs, the internal temperature of the rechargeable battery may be abruptly increased resulting in an increased risk of ignition or explosion of the rechargeable battery. This risk that a high-capacity rechargeable battery may ignite or explode is even further increased when the current flow is large due to an external short circuit.

SUMMARY

Aspects of the present invention relate to a rechargeable battery, and more particularly, to a high-capacity rechargeable battery having an improved safety member.

A rechargeable battery according to an embodiment of the present invention includes a plurality of electrode assemblies including a first electrode assembly and a second electrode assembly, a case housing the plurality of electrode assemblies, a cap assembly coupled to the case, and a first safety member including a first conductive plate between the first electrode assembly and the case, a second conductive plate between the second electrode assembly and the case, and a safety fuse between the first conductive plate and the second conductive plate and coupling the first and second conductive plates together.

The case may have a bottom opposite to the cap assembly, and the first and second electrode assemblies may be spaced apart in a first direction extending toward the cap assembly from the bottom.

The first and second electrode assemblies may be stacked in the first direction.

The case may further include a first frontal side extending in the first direction from the bottom, and a second frontal side facing the first frontal side. The first conductive plate may be between the first frontal side and the first electrode assembly, and the second conductive plate may be between the first frontal side and the second electrode assembly.

The first conductive plate may include a first connection portion coupled to the positive electrode of the first electrode assembly, and the second conductive plate may include a second connection portion coupled to the positive electrode of the second electrode assembly.

In addition, the first and second connection portions may be spaced apart in the first direction.

The rechargeable battery may further include a second safety member between the second frontal side and the plurality of electrode assemblies.

The second safety member may include a first conductive plate between the second frontal side and the first electrode assembly, a second conductive plate between the second frontal side and the second electrode assembly, and a safety fuse between the first conductive plate and the second conductive plate and coupling the first and second conductive plates together.

The rechargeable battery may further include a current collecting member coupled to the positive electrodes of the plurality of electrode assemblies, and the current collecting member include a current collecting fuse portion which has a smaller cross-sectional area than a periphery region.

The current collecting member may further include a first adhesion portion coupled to the first electrode assembly and a second adhesion portion coupled to the second electrode assembly. The current collecting fuse portion may be between the first and second adhesion portions.

The first and second conductive plates may further include insulating film.

The insulating film may be coupled to the safety fuse.

The first conductive plate, the second conductive plate, and the safety fuse may be positioned on the same plane.

The safety fuse may have a smaller cross-sectional area than a periphery region, and the safety member may further include cut-outs is at each respective end of the safety fuse between the first and second conductive plates.

The safety fuse may be coupled to respective lateral ends of the cut-outs in the first safety member.

The plurality of electrode assemblies of the rechargeable battery may include a plurality of the first electrode assemblies multi-layered in a direction perpendicular to the first direction.

Each of the first and second electrode assemblies are generally flat. Each of the first and second electrode assemblies may include positive electrode uncoated regions at one lateral end, and negative electrode uncoated regions at the other lateral end. The first electrode assembly may further include a first plane which couples the negative electrode uncoated region to the positive electrode uncoated region, wherein the first conductive plate of the first safety member faces the first flat plane. The second electrode assembly may further include a second plane which couples the negative electrode uncoated region to the positive electrode uncoated region, wherein the second conductive plate of the first safety member faces the second plane.

The first electrode assembly may be closer to the cap assembly than the second electrode assembly.

According to an embodiment of the present invention, because the safety fuse is positioned between the first and second conductive plates, in a situation where a foreign conductive material, such as a nail or an awl, enters the rechargeable battery, and a short circuit occurs in one of the electrode assemblies, a short-circuit current is prevented from flowing to the other electrodes assemblies due to melting of the safety fuse.

According to an embodiment of the present invention, because first and second electrode assemblies are spaced apart in a height direction of the rechargeable battery, and the current collecting fuse portion in the current collecting member is between the first and second electrode assemblies, the current flowing to other electrode assemblies can be prevented when a short circuit occurs in one electrode assembly.

BRIEF DESCRIPTION OF THE DRAWINGS

Example embodiments will now be described more fully with reference to the accompanying drawings; however, aspects of the present invention may be embodied in different forms and should not be construed as limited to the embodiments set forth herein. Rather, these embodiments are provided for thoroughness and completeness of this disclosure, and will fully convey the scope of the example embodiments to those skilled in the art.

In the drawing figures, dimensions may be exaggerated for clarity of illustration. It will be understood by those skilled in the art that when an element is referred to as being "between" to elements, it can be the only element between the two elements, or one or more intervening elements may also be present.

DETAILED DESCRIPTION

Figure 1:
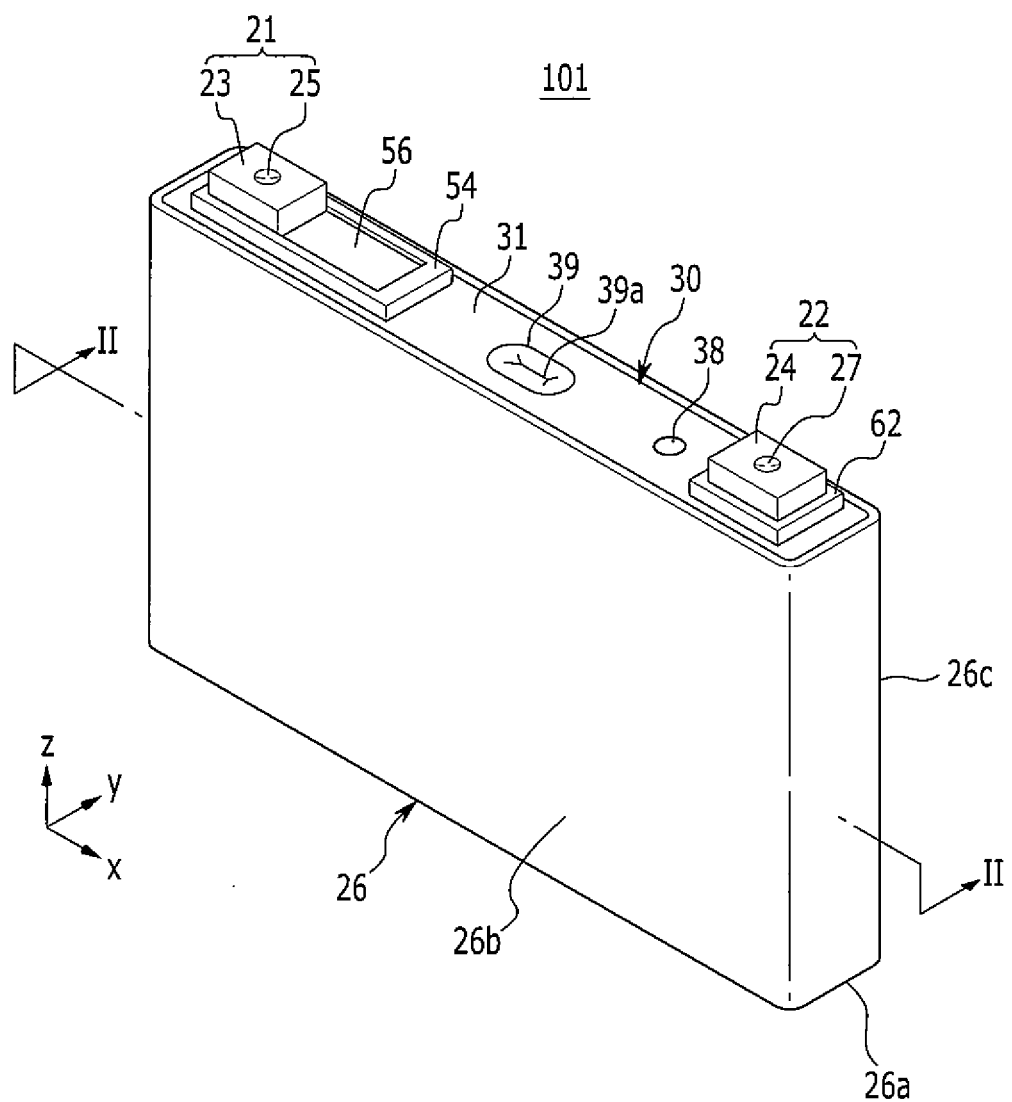
FIG. 1 is a perspective view of a rechargeable battery according to a first embodiment.

Aspects of the present invention will be described more fully hereinafter with reference to the accompanying drawings, in which exemplary embodiments are shown. As those skilled in the art would recognize, the described embodiments may be modified in various ways, all without departing from the spirit or scope of the present invention. Like reference numerals refer to like elements throughout the specification and drawings.

Figure 2:
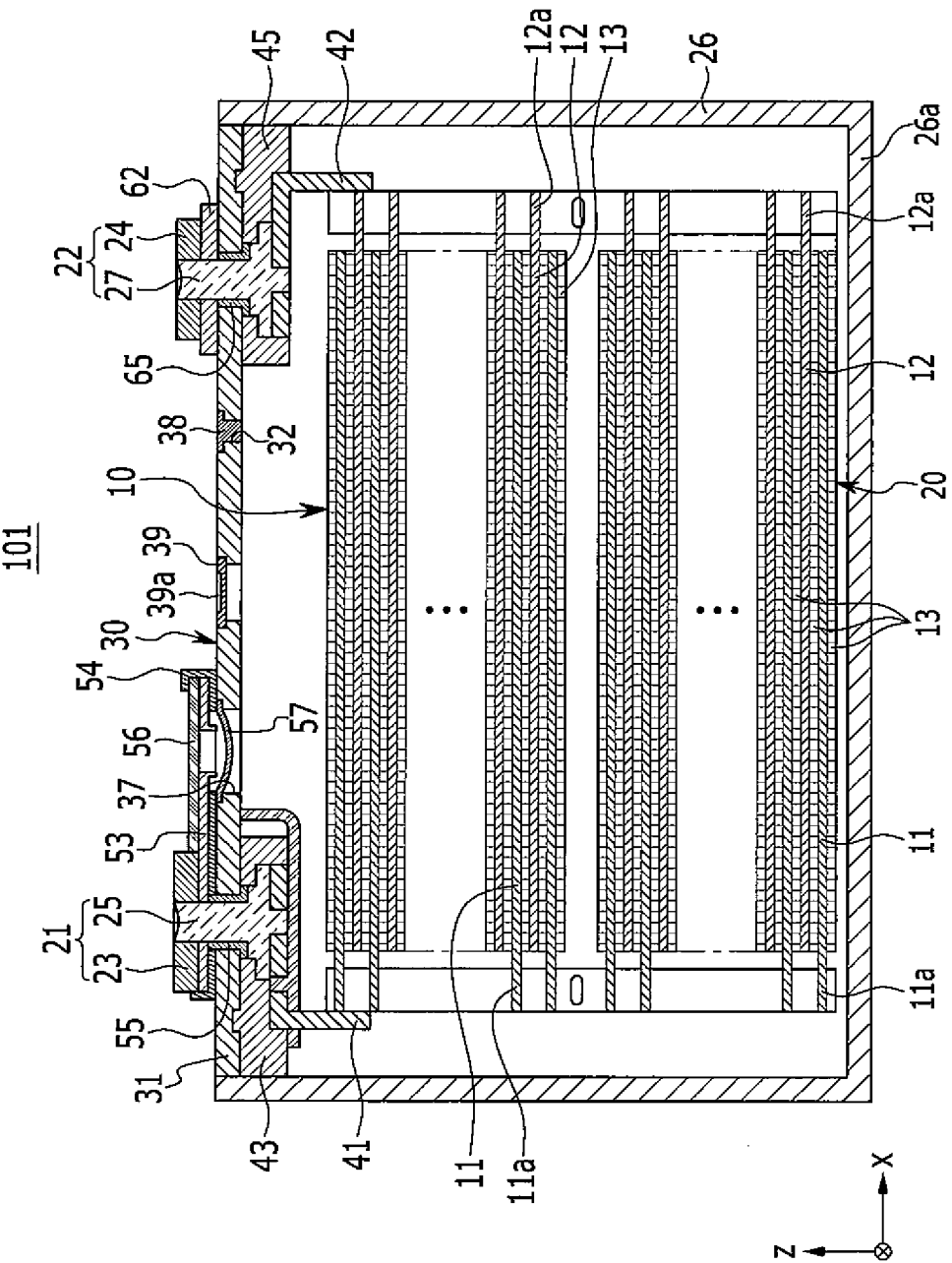
FIG. 2 is a cross-sectional view of the rechargeable battery of FIG. 1, taken along line II-II.

FIG. 1 is a perspective view of a rechargeable battery according to a first embodiment, and FIG. 2 is a cross-sectional view of the rechargeable battery of FIG. 1, taken along line II-II.

Referring to FIG. 1 and FIG. 2, the rechargeable battery 101 according to the first embodiment includes: first and second electrode assemblies 10 and 20 wound with a separator 13 between a negative electrode 11 and a positive electrode 12; a case 26 in which the first and second electrode assemblies 10 and 20 are stored; and a cap assembly 30 coupled to an opening of the case 26.

The rechargeable battery 101 according to the first embodiment may be a prism-shaped lithium ion rechargeable battery 101. However, the present invention is not limited thereto, and the rechargeable battery 101 can include various types of batteries such as a lithium polymer battery, or a cylindrical battery, etc., having various shapes.

According to an embodiment, the negative electrode 11 includes a coated region where a negative active material is coated on a current collector formed of a thin metal such as copper, and a negative electrode uncoated region 11a where a negative active material is not coated on the negative electrode 11.

According to an embodiment, the positive electrode 12 includes a coated region where a positive active material is coated on a current collector formed of a thin metal such as aluminum, and a positive electrode uncoated region 12a where a positive active material is not coated on the positive electrode 12.

The positive electrode uncoated region 12a may be located at one lateral end of the electrode assemblies 10 and 20, and the negative electrode uncoated region 11a may be located at an opposite end of the electrode assemblies 10 and 20.

Figure 3:
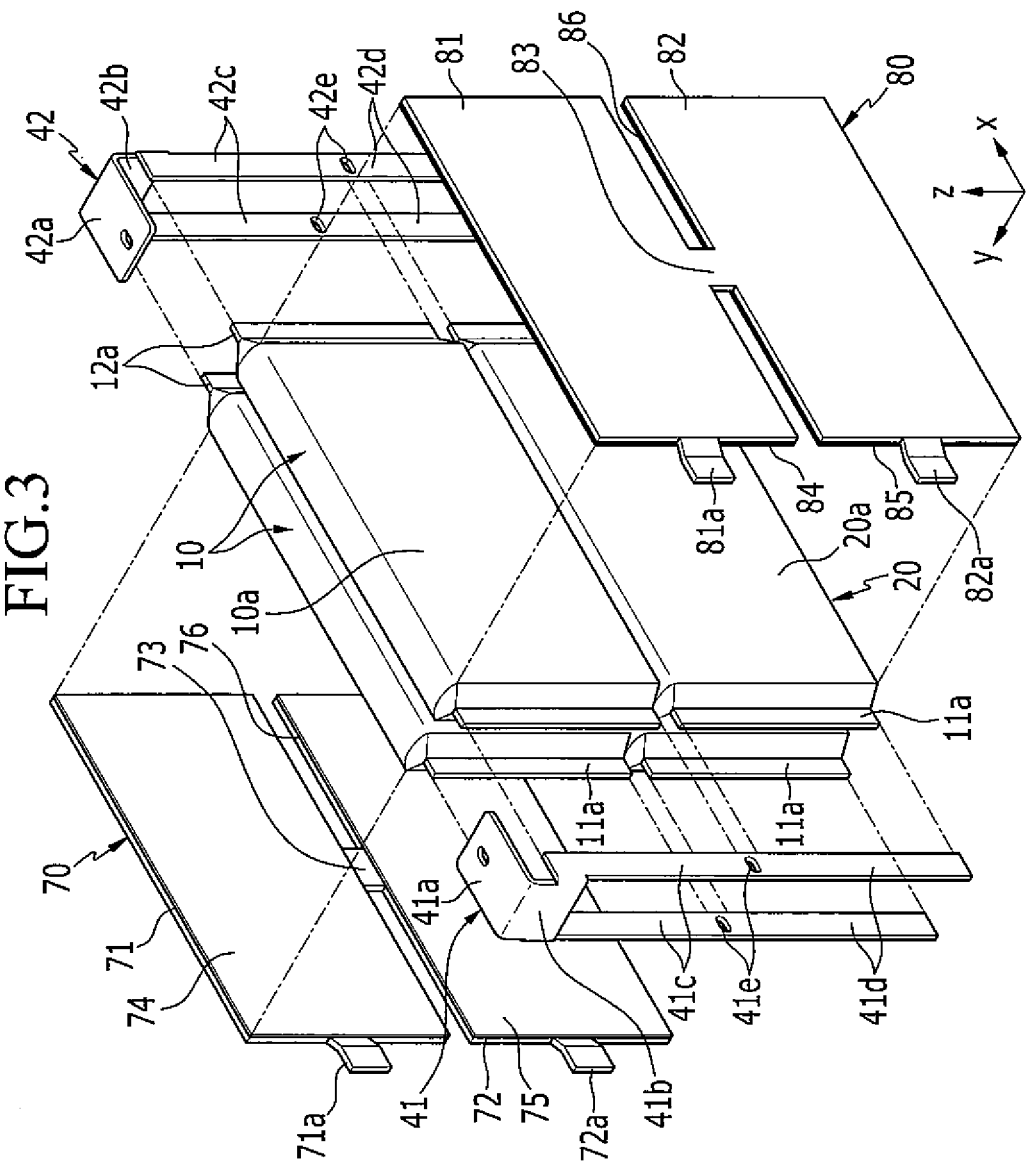
FIG. 3 is an exploded perspective view of a current collecting member, an electrode assembly, and a safety member of the rechargeable battery according to the first embodiment.

The first electrode assembly 10 may include a flat plane 10a (as shown in FIG. 3) connecting the negative electrode uncoated region 11a and the positive electrode uncoated region 12a, and the second electrode assembly 20 may also include a flat plane 20a (as shown in FIG. 3) connecting the negative electrode uncoated region 11a and the positive electrode uncoated region 12a.

In an embodiment, the negative and positive electrodes 11 and 12 are spirally wound around a winding axis with the separator 13 between them, the separator 13 acting as an insulator, between the negative and positive electrodes 11 and 12. After being spirally wound, the first and second electrode assemblies 10 and 20 may be pressed to create the flat planes 10a and 20a.

In an embodiment, the first and second electrode assemblies 10 and 20 are inserted into the case 26 with their winding axis placed in parallel with a cap plate 31 such that the negative and positive electrode uncoated regions 11a and 12a are located at respective lateral ends thereof.

In addition, the first and second electrode assemblies 10 and 20 are positioned to be stacked in a first direction (z-axis direction) of the case 26.

As described herein, the first direction means in a height-direction of the case 26 (z-axis direction in FIG. 2) towards the cap assembly 30 from a bottom 26a of the case 26. However, the present disclosure is not limited thereto, and the first direction can be any direction as understood by those skilled in the art.

In the embodiment shown in FIG. 2, the first electrode assembly 10 is positioned closer to the cap assembly 30 than the second electrode assembly 20, and the first and second electrode assemblies 10 and 20 are spaced apart in a first direction.

In an embodiment, the first and second electrode assemblies 10 and 20 are stacked along the first direction, and are parallel with each other. Accordingly, outer sides of the first and second electrode assemblies 10 and 20 in these embodiments are located on a same plane.

A plurality of first electrode assemblies 10 are positioned as multi-layers in a thickness direction (y-axis direction shown in FIG. 3) of the case 26 perpendicular to the first direction. In addition, a plurality of the second electrode assemblies 20 are also positioned as multi-layered in the thickness direction of the case 26.

In an embodiment, the case 26 is roughly a cuboid shape, and the opening is at one side of the case 26.

The cap assembly 30 includes the cap plate 31 covering the opening of the case 26, a first terminal 21 protruding out of the cap plate 31 and electrically connected to the negative electrode 11, a second terminal 22 protruding out of the case 26 and electrically connected to the positive electrode 12, and a vent 39 having a notch 39a configured to be ruptured at a predetermined internal pressure.

According to embodiments of the present invention, the cap plate 31 has an elongated plate shape in one direction, and is coupled to the opening of the case 26. The cap plate 31 may include a sealing cap 38 configured to seal an electrolyte injection opening 32 of the cap assembly 30.

In an embodiment, the first and second terminals 21 and 22 are configured to protrude from and extend above the cap plate 31.

In the embodiment in FIG. 2, the first terminal 21 is electrically connected to the negative electrode 11 through a current collecting member 41, while the second terminal 22 is electrically connected to the positive electrode 12 through a current collecting member 42. However, the present invention is not limited thereto, and the first terminal 21 may be electrically connected to the positive electrode 12, while the second terminal 22 may be electrically connected to the negative electrode 11.

The first terminal 21 may include an outer terminal 23 which is exposed to an exterior of the case 26, and a connecting terminal 25 which penetrates through the outer terminal 23 and is bonded to the current collecting member 41. The outer terminal 23 may have a plate shape, and the connecting terminal 25 may have a pillar shape. In the embodiment shown in FIG. 2, the connecting terminal 25 penetrates the cap plate 31 and the outer terminal 23, and an upper part of the connecting terminal 25 is fixed to the outer terminal 23, for example by a caulking and welding connection.

A gasket 55 may be inserted into the opening which the connecting terminal 25 penetrates through the cap plate 31, and a lower insulating member 43 may be located at an inner side of the cap plate 31 to insulate the first terminal 21 from the current collecting member 41 at the cap plate 31.

In an embodiment, a short-circuit tab 53 is electrically connected to the first terminal 21 and located on the cap plate 31. An upper insulating member 54 configured to electrically insulate the short-circuit tab 53 from the cap plate 31 may be provided between the short-circuit tab 53 and the cap plate 31.

In the embodiment shown in FIG. 2, the outer terminal 23 is located at one side of the short-circuit tab 53, and a protecting cover 56 is located at the other side of the short-circuit tab 53.

The cap assembly 30 may further include a short-circuit member 57 configured to short-circuit the negative and positive electrodes 11 and 12, the short-circuit member 57 may be fixed to the cap plate 31 which is positively charged, and may become deformed to be connected to the short-circuit tab 53 which is negatively charged when the internal pressure of the rechargeable battery 101 increases.

A short-circuit opening 37 may be defined in the cap plate 31, and the short-circuit member 57 may be located between the upper insulating member 54 and the cap plate 31 in the short-circuit opening 37.

The short-circuit member 57 may have an arc-shaped portion curving downwards and an invertible plate having an edge portion fixed to the cap plate 31.

The second terminal 22 may include an externally exposed outer terminal 24 and a connecting terminal 27. The outer terminal 24 may have a plate shape, and the connecting terminal 27 may have a pillar shape. In an embodiment, the connecting terminal 27 penetrates through the outer terminal 24 and is fixed thereto.

In this embodiment, the connecting terminal 27 may be fixed to the current collecting member 42 by welding, and may penetrate the cap plate 31 such that an upper part of the connecting terminal 27 contacts the outer terminal 24 and is fixed thereto.

A gasket 65 for sealing may be inserted into an opening between the connecting terminal 27 and the cap plate 31 where the connecting terminal 27 penetrates through, and a lower insulating member 45 may be located under the cap plate 31 to insulate the connecting terminal 27 from the current collecting member 42 at the cap plate 31.

A connecting plate 62 which electrically connects the second terminal 22 and the cap plate 31 may be located at the second terminal 22. Accordingly, in this embodiment, the cap plate 31 may be electrically connected to the positive electrode 12 such that it is positively charged.

Figure 4:
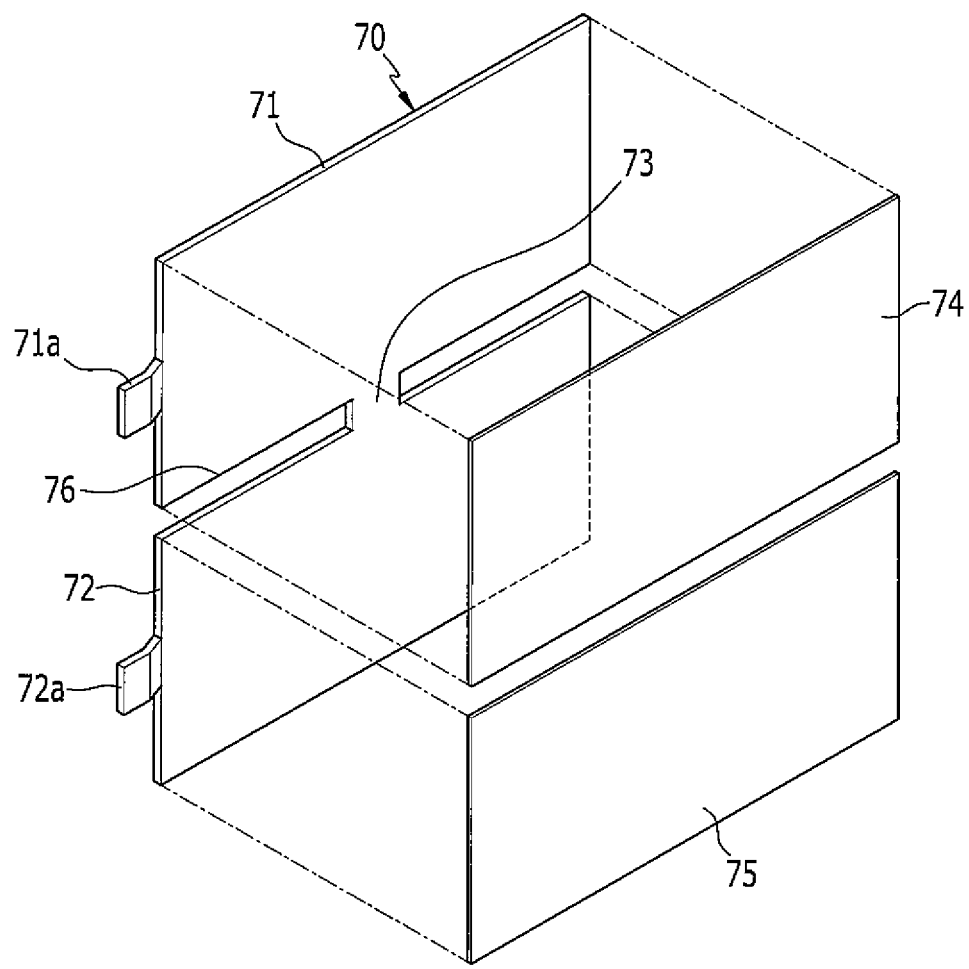
FIG. 4 is an exploded perspective view of the safety member according to the first embodiment.

FIG. 3 is an exploded perspective view of the current collecting member, the electrode assembly, and a safety member of the rechargeable battery according to the first embodiment, and FIG. 4 is an exploded perspective view of the safety member according to the first embodiment.

Referring to FIGS. 3 and 4, the first terminal 21 is electrically connected to the negative electrode 11 through the current collecting member 41, while the second terminal 22 is electrically connected to the positive electrode 12 through the current collecting member 42. The current collecting member 41 according to these embodiments includes a terminal connecting portion 41a which is bonded to the connecting terminal 25, and two current collecting pieces which extend downwards from the terminal connecting portion 41a.

The terminal connecting portion 41a may be a quadrangle plate shape, and may be fixed to a lower part of the connecting terminal 25.

In the embodiments, the terminal connecting portion 41a includes an opening, and the connecting terminal 25 and the terminal connecting portion 41a may be welded while a protrusion extending from the connecting terminal 25 may be fitted through the opening.

A side plate 41b bent in a downward direction toward the bottom 26a of the case 26 may be located at one side of the terminal connecting portion 41a. The current collecting pieces may be bent toward the electrode assemblies 10 and 20 from respective lateral ends of the side plate 41b.

According to the embodiments in FIGS. 3 and 4, the current collecting piece includes a first adhesion portion 41c which is bonded to the negative electrode uncoated regions 11a of the first electrode assembly 10, and a second adhesion portion 41d which is bonded to the negative electrode uncoated regions 11a of the second electrode assembly 20.

According to these embodiments, the first and second adhesion portions 41c and 41d are spaced apart in the first direction, and the first adhesion portion 41c is located closer to the cap assembly 30 than the second adhesion portion 41d.

A current collecting fuse portion 41e may be provided between the first adhesion portion 41c and the second adhesion portion 41d, and may have an opening. Accordingly, in this embodiment, because the current collecting fuse portion 41e has a smaller cross-sectional area than a periphery region, the current is cut off due to melting when an excessive current flows.

The current collecting member 42 according to the embodiments in FIGS. 3 and 4 includes a terminal connecting portion 42a which is bonded to the connecting terminal 27, and two current collecting pieces which extend downwards from the terminal connecting portion 42a.

The terminal connecting portion 42a may be a quadrangle plate shape, and may be fixed to a lower part of the connecting terminal 27 by welding.

The terminal connecting portion 42a may have an opening, and the connecting terminal 27 and the terminal connecting portion 42a may be welded while a protrusion extending from the connecting terminal 27 may be fitted through the opening.

A side plate 42b bent in a downward direction toward the bottom 26a of the case 26 may be located at one side of the terminal connecting portion 42a. The current collecting pieces may be bent toward the electrode assemblies 10 and 20 from respective lateral ends of the side plate 42b.

According to these embodiments, the current collecting piece includes a first adhesion portion 42c which is bonded to the positive electrode uncoated regions 12a of the first electrode assembly 10, and a second adhesion portion 42d which is bonded to the positive electrode uncoated regions 12a of the second electrode assembly 20.

The first and second adhesion portions 42c and 42d may be spaced apart in the first direction, and the first adhesion portion 42c may be located closer to the cap assembly 30 than the second adhesion portion 42d.

A current collecting fuse portion 42e may be provided between the first adhesion portion 42c and the second adhesion portion 42d, and may have an opening. Accordingly, because the current collecting fuse portion 42e has a smaller cross-sectional area than a periphery region, in these embodiments, the current is cut off due to melting when an excessive current flows.

As shown in the embodiment in FIG. 4, first and second safety members 70 and 80 are positioned between the electrode assemblies 10 and 20 and the case 26. The case 26 according to these embodiments includes first and second frontal sides 26b and 26c which extend toward the first direction from the bottom 26a of the case 26 and face each other. The first and second frontal sides 26b and 26c are the largest planes of the case 26 according to these embodiments and may have a hexahedral shape, positioned in parallel with the flat planes 10a and 20a of the first and second electrode assemblies 10 and 20.

The first safety member 70 may be positioned between the first frontal side 26b and the electrode assemblies 10 and 20, while the second safety member 80 may be positioned between the second frontal sides 26c and the electrode assemblies 10 and 20.

The first safety member 70, according to an embodiment, includes a first conductive plate 71 which is located between the first frontal side 26b and the first electrode assembly 10, a second conductive plate 72 which is located between the first frontal side 26b and the second electrode assembly 20, and a safety fuse 73 connecting the first and second conductive plates 71 and 72.

The first and second conductive plates 71 and 72 may be integrally formed with the safety fuse 73 such that they are all positioned on the same plane.

The first and second conductive plates 71 and 72 may be spaced apart in the first direction, with the first conductive plate 71 located closer to the cap assembly 30 than the second conductive plate 72.

The first and second conductive plates 71 and 72 may be made of a thin metal plate in a quadrangle shape, for example, a thin copper plate.

The safety fuse 73 may be located at a corresponding position between the first and second electrode assemblies 10 and 20. The safety fuse 73, according to these embodiments, has a smaller cross-sectional area than a periphery region, and is thus melted when an excessive current flows. Accordingly, the safety fuse 73 may prevent excessive current such as to cause a short-circuit, etc.

The respective lateral ends of the safety fuse 73 may have cut-outs 76, and the safety fuse 73 may be positioned at a center of the first and second conductive plates 71 and 72 along a width direction thereof, between the cut-outs 76.

The first conductive plate 71 may be parallel with the first frontal side 26b and the flat plane 10a of the first electrode assembly 10, while the second conductive plate 72 may be parallel with the first frontal side 26b and the flat plane 20a of the second electrode assembly 20.

A first connection portion 71a may protrude from one lateral end of the first conductive plate 71 connected to the negative electrode uncoated region 11a of the first electrode assembly 10, while a second connection portion 72a may protrude from one lateral end of the second conductive plate 72 connected to the negative electrode uncoated region 11a of the second electrode assembly 20. The first and second connection portions 71a and 72a may be spaced apart in the first direction.

The first and second connection portions 71a and 72a may be directly bonded to the negative electrode uncoated region 11a, for example by welding, and may be electrically connected to the negative electrode uncoated region 11a through the current collecting member 41.

An insulating film 74 is attached to the first conductive plate 71, and an insulating film 75 is equally attached to the second conductive plate 72, according to the embodiments shown in FIGS. 3 and 4. The insulating film 74 according to these embodiments is located between the first conductive plate 71 and the first electrode assembly 10, while the insulating film 75 is located between the second conductive plate 72 and the second electrode assembly 20.

In an embodiment, the second safety member 80 includes a first conductive plate 81 which is positioned between the second frontal sides 26c and the first electrode assembly 10, a second conductive plate 82 which is positioned between the second frontal side 26c and the second electrode assembly 20, and a safety fuse 83 connecting the first and second conductive plates 81 and 82.

The first and second conductive plates 81 and 82 may be integrally formed with the safety fuse 83 such that they are all positioned on the same plane. The first and second conductive plates 81 and 82 may be spaced apart in the first direction, and the first conductive plate 81 may be located closer to the cap assembly 30 than the second conductive plate 82.

The first and second conductive plates 81 and 82 may be made of a thin metal plate in a quadrangle shape, for example, a thin aluminum plate.

The safety fuse 83 may be located at a corresponding position between the first and second electrode assemblies 10 and 20. The safety fuse 83, according to these embodiments, has a smaller cross-sectional area than a periphery region, and may thus melt when an excessive current flows. Accordingly, the safety fuse 83, according to these embodiments, may prevent excessive current such as to cause a short-circuit, etc.

The respective lateral ends of the safety fuse 83 may have cut-outs 86 at respective lateral ends of the safety fuse 83, and the safety fuse 83 may be located at the center of the first and second conductive plates 81 and 82 in a width direction thereof.

The first conductive plate 81 may be parallel with the second frontal side 26c and the flat plane 10a of the first electrode assembly 10, while the second conductive plate 82 may be parallel with the second frontal side 26c and the flat plane 20a of the second electrode assembly 20.

A first connection portion 81a may protrude from one lateral end of the first conductive plate 81 connected to the negative electrode uncoated region 11a, while a second connection portion 82a may protrude from one lateral end of the second conductive plate 82 connected to the negative electrode uncoated region 11a. In these embodiments, the first and second connection portions 81a and 82a may be spaced apart in the first direction. The first and second connection portions 81a and 82a according to these embodiments may be directly bonded to the negative electrode uncoated region 11a, for example by welding, and may be electrically connected to the negative electrode uncoated region 11a through the current collecting member 41.

An insulating film 84 may be attached to the first conductive plate 81, and an insulating film 85 may also be attached to the second conductive plate 82. The insulating film 84 may be located between the first conductive plate 81 and the first electrode assembly 10, while the insulating film 85 may be located between the second conductive plate 82 and the second electrode assembly 20.

As described above, according to the current embodiments, a plurality of the electrode assemblies 10 and 20 may be in parallel with each other while spaced apart in a height direction of the case 26. When a foreign conductive material, such as a nail or similar tool, gadget, or appliance, may enter into the case 26, the foreign conductive material according to embodiments of the present invention only penetrates one of the electrode assemblies 10 or 20.

According to the embodiments of the present invention, when the foreign conductive material penetrates one of the safety members 70 or 80, a short circuit may be triggered by the case 26—which is positively charged—and the safety member 70 or 80—which is negatively charged, and when the short circuit occurs, a short-circuit current may be prevented from flowing to the other electrode assemblies 10 or 20 through the safety members 70 or 80 due to melting of the safety fuse 73 or 83.

In addition, because the current collecting fuse portion 41e or 42e is located between the first electrode assembly 10 and the second electrode assembly 20, according to embodiments of the present invention, current flowing to other electrode assemblies 10 and 20 may be cut off due to melting of the current collecting fuse portion 41e or 42e when the short-circuit current flows. As a rechargeable battery having a plurality of electrode assemblies stores a large amount of current, ignition or explosion risk increases due to high current when a short-circuit occurs. However, according to embodiments of the present invention, if the electrode assemblies 10 and 20 are stacked in a height direction of the case 26, the foreign conductive material only penetrates half the electrode assemblies 10 and 20, and, thus, a short-circuit current is prevented from flowing to the remaining electrode assemblies 10 and 20. According to these embodiments, the amount of short-circuit current may be reduced to half.

In addition, because the current collecting fuse portion 41e or 42e is positioned between the first and second electrode assemblies 10 and 20 in these embodiments, current is cut off by melting of the current collecting fuse portion 41e or 42e when a short-circuit is induced by the increased internal pressure of the rechargeable battery 101 or when an external short-circuit happens. In this embodiment, the part attached to the second electrode assembly 20 drops down. Accordingly, even if the current collecting fuse portion is melted, an arc is prevented from being generated at the welded part as a distance between melted parts is increased. This effect is equally applied to the safety fuse 73 or 83 according to embodiments of the present invention.

Figure 5:
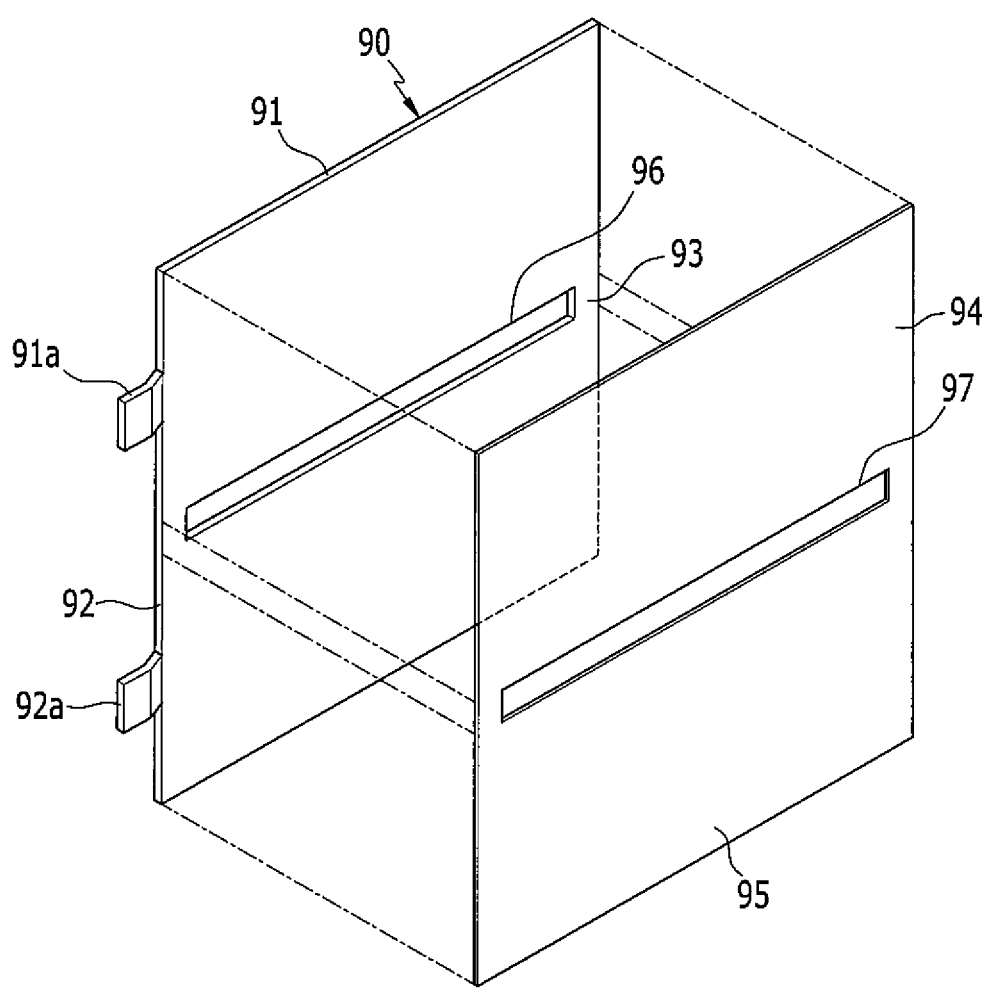
FIG. 5 is an exploded perspective view of a safety member according to a second embodiment.

FIG. 5 is an exploded perspective view of a safety member according to a second embodiment.

Because the rechargeable battery 101 according to the current embodiment has the same structure as the rechargeable battery 101 according to the first embodiment, except for a safety member 90, a repeated description of the same structure has been omitted. In addition, since the second safety member 80 has the same structure as the first safety member 90, a description of the second safety member 80 is replaced with that of the first safety member 90.

The first safety member 90 according to this embodiment includes a first conductive plate 91 between the first frontal sides 26b and the first electrode assembly 10, a second conductive plate 92 between the first frontal side 26b and the second electrode assembly 20, and a safety fuse 93 connecting the first and second conductive plates 91 and 92.

The first and second conductive plates 91 and 92 may be integrally formed with the safety fuse 93 such that they are all positioned on the same plane. The first and second conductive plates 91 and 92 may be spaced apart in the first direction, and the first conductive plate 91 may be positioned closer to the cap assembly 30 than the second conductive plate 92.

The first and second conductive plates 91 and 92 may be made of a thin metal plate having a quadrangle shape, for example a thin copper plate.

The safety fuse 93 may be located at a corresponding position between the first and second electrode assemblies 10 and 20. The safety fuse 93 according to these embodiments has a smaller cross-sectional area than a periphery region, and, thus, melts when an excessive current flows. Accordingly, the safety fuse 93 may prevent excessive current to cause a short-circuit, etc. The safety fuse 93 according to this embodiment is located at respective lateral ends of a fuse opening 96, and the fuse opening 96 is located between the first and second conductive plates 91 and 92.

A first connection portion 91a may protrude from one lateral end of the first conductive plate 91 connected to the negative electrode uncoated region 11a, while a second connection portion 92a may protrude from one lateral end of the second conductive plate 92 connected to the negative electrode uncoated region 11a.

According to these embodiments, an insulating film 94 is attached to the first and second conductive plates 91 and 92. An insulating film 95 may also be attached to the safety fuse 93, covering the safety fuse 93. Further, a connecting opening 97 may be defined in the insulating film 95 at a position corresponding to the fuse opening 96.

Figure 6:
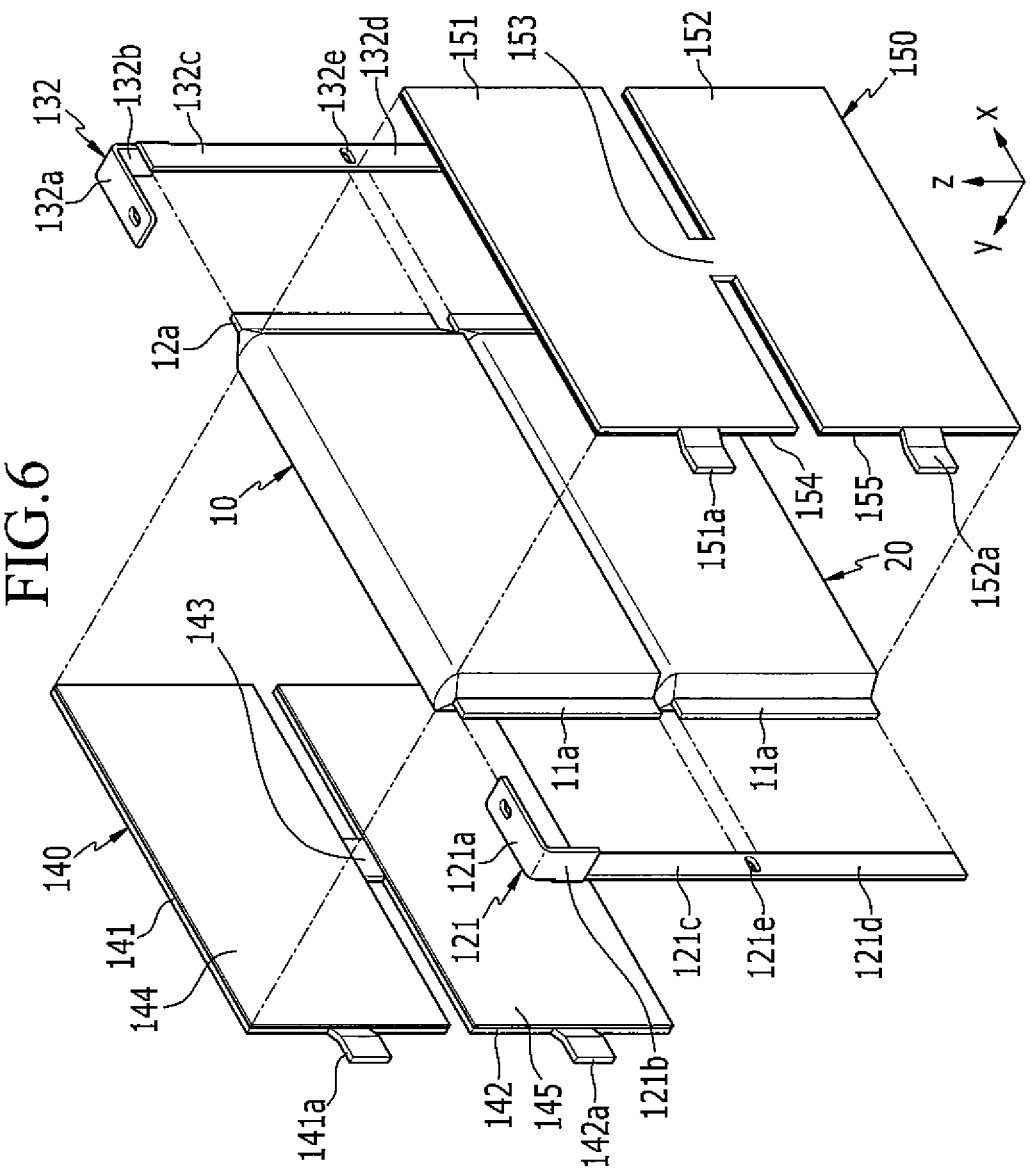
FIG. 6 is an exploded perspective view of a current collecting member, an electrode assembly, and a safety member of the rechargeable battery according to a third embodiment.

FIG. 6 is an exploded perspective view of a current collecting member, an electrode assembly, and a safety member of the rechargeable battery according to a third embodiment.

Because the rechargeable battery 101 according to the current embodiment has the same structure as the rechargeable battery 101 according to the first embodiment, except for an arrangement of electrode assemblies 10 and 20 and a structure of a safety member 140 or 150, a repeated description of the same structure has been omitted.

The rechargeable battery 101 according to the current embodiment includes electrode assemblies 10 and 20, current collecting members 121 and 132, and first and second safety members 140 and 150.

The first and second electrode assemblies 10 and 20 may be stacked in the first direction (z-axis direction) of the case 26. According to the embodiment of FIG. 6, the first electrode assembly 10 is located closer to the cap assembly 30 than the second electrode assembly 20, and the first and second electrode assemblies 10 and 20 are spaced apart from each other in a first direction.

The first and second electrode assemblies 10 and 20 according to this embodiment are not multi-layered in a thickness direction (y-axis direction in FIG. 6) of the case 26, and the rechargeable battery having only one first electrode assembly 10 and one second electrode assembly 20.

The current collecting member 121 according to this embodiment includes a terminal connecting portion 121a which is bonded to the connecting terminal 25, and a current collecting piece which extends downward from the terminal connecting portion 121a.

The terminal connecting portion 121a may have a quadrangle plate shape, and may be fixed to a lower part of the connecting terminal 25, for example by welding. A side plate 121b bent in a downward direction toward the bottom 26a of the case 26 may be located at one side of the terminal connecting portion 121a. The current collecting piece may be bent toward the electrode assemblies 10 and 20 from one lateral end of the side plate 121b.

The current collecting piece according to an embodiment includes a first adhesion portion 121c which is bonded to the negative electrode uncoated regions 11a of the first electrode assembly 10, and a second adhesion portion 121d which is bonded to the negative electrode uncoated regions 11a of the second electrode assembly 20. The first and second adhesion portions 121c and 121d may be spaced apart in the first direction, and a current collecting fuse portion 121e may be located between the first and second adhesion portions 121c and 121d. The current collecting fuse portion 121e may have an opening. Accordingly, because the current collecting fuse portion 121e according to these embodiments has a smaller cross-sectional area than a periphery region, the current is cut off due to melting when an excessive current flows.

The current collecting member 132 may include a terminal connecting portion 132a which is bonded to the connecting terminal 27, and a current collecting piece which extends downwards from the terminal connecting portion 132a.

The terminal connecting portion 132a may be a quadrangle plate shape, and may be fixed to a lower part of the connecting terminal 27, for example by welding. A side plate 132b according to an embodiment is bent in a downward direction toward the bottom 26a of the case 26 at one side of the terminal connecting portion 132a.

The current collecting piece may be bent toward the electrode assemblies 10 and 20 from one lateral end of the side plate 132b. The current collecting piece according to these embodiments includes a first adhesion portion 132c which is bonded to the positive electrode uncoated regions 12a of the first electrode assembly 10, and a second adhesion portion 132d which is bonded to the positive electrode uncoated regions 12a of the second electrode assembly 20. The first and second adhesion portions 132c and 132d may be spaced apart in the first direction, and a current collecting fuse portion 132e may be positioned between the first and second adhesion portions 132c and 132d. The current collecting fuse portion 132e may have an opening. Accordingly, because the current collecting fuse portion 132e according to these embodiments has a smaller cross-sectional area than a periphery region, the current may be cut off due to melting when an excessive current flows.

The first safety member 140 may include a first conductive plate 141 between the first frontal sides 26b and the first electrode assembly 10, a second conductive plate 142 between the first frontal side 26b and the second electrode assembly 20, and a safety fuse 143 connecting the first and second conductive plates 141 and 142.

The first and second conductive plates 141 and 142 may be integrally formed with the safety fuse 143 such that they are all positioned on the same plane. The first and second conductive plates 141 and 142 may be spaced apart in the first direction, with the first conductive plate 141 located closer to the cap assembly 30 than the second conductive plate 142. The first and second conductive plates 141 and 142 may be made of a thin metal plate having a quadrangle shape, for example a thin copper plate.

The safety fuse 143 according to these embodiments is located at a corresponding position between the first and second electrode assemblies 10 and 20. The safety fuse 143 may have a smaller cross-sectional area than the periphery region, and may melt when an excessive current flows. Accordingly, the safety fuse 143 may prevent excessive current such as to cause a short-circuit current, etc.

A first connection portion 141a according to an embodiment protrudes from one lateral end of the first conductive plate 141 connected to the negative electrode uncoated region 11a, while a second connection portion 142a protrudes from one lateral end of the second conductive plate 142 connected to the negative electrode uncoated region 11a. Insulating films 144 and 145 may be respectively connected to the first and second conductive plates 141 and 142.

The second safety member 150 according to these embodiments includes a first conductive plate 151 between the second frontal sides 26c and the first electrode assembly 10, a second conductive plate 152 between the second frontal side 26c and the second electrode assembly 20, and a safety fuse 153 connecting the first and second conductive plates 151 and 152.

The first and second conductive plates 151 and 152 are integrally formed with the safety fuse 153 such that they are all disposed on the same plane.

The first and second conductive plates 151 and 152 according to an embodiment are spaced apart in the first direction, with the first conductive plate 151 positioned closer to the cap assembly 30 than the second conductive plate 152.

The first and second conductive plates 151 and 152 may be made of a thin metal plate having a quadrangle shape, for example a thin copper plate.

The safety fuse 153 may be located at a corresponding position between the first and second electrode assemblies 10 and 20. The safety fuse 153 according to these embodiments has a smaller cross-sectional area than a periphery region, and is, thus, melted when an excessive current flows. Accordingly, the safety fuse 153 may prevent excessive current such as to cause a short-circuit current, etc.

A first connection portion 151a according to an embodiment protrudes from one lateral end of the first conductive plate 151 connected to the negative electrode uncoated region 11a, while a second connection portion 152a protrudes from one lateral end of the second conductive plate 152 connected to the negative electrode uncoated region 11a. Insulating films 154 and 155 may be respectively connected to the first and second conductive plates 151 and 152, according to an embodiment.

It is to be understood that the invention is not limited to the disclosed embodiments, but, is intended to cover various modifications and equivalent arrangements included within the spirit and scope of the invention and disclosure, taken in its entirety.

| Description of Reference Numerals |
| --- |
| 101: rechargeable battery |
| 10: first electrode assembly |
| 20: second electrode assembly |
| 11: negative electrode |
| 12: positive electrode |
| 13: separator |
| 11a: negative electrode uncoated region |
| 12a. positive electrode uncoated region |
| 10a, 20a: flat plane |
| 21: first terminal |
| 22: second terminal |
| 23, 24: outer terminal |
| 25, 27: connecting terminal |
| 26: case |
| 30: cap assembly |
| 26a: bottom of the case |
| 26b, 26c: first and second frontal sides |
| 31: cap plate |
| 32: electrolyte injection opening |
| 37: short-circuit opening |
| 38: sealing cap |
| 39: vent |
| 39a: notch |
| 41, 42, 121, 132: current collecting member |
| 41a, 42a, 121a, 132a: terminal connecting portion |
| 41b, 42b, 121b, 132b: side plate |
| 41c, 42c, 121c, 132c: first adhesion portion |
| 41d, 42d, 121d, 132d: second adhesion portion |
| 41e, 42e, 121e, 132e: current collecting fuse portion |
| 43, 45: lower insulating member |
| 53: short-circuit tab |
| 54: upper insulating member |
| 55, 65: gasket |
| 56: protecting cover |
| 57: short-circuit member |
| 62: connecting plate |
| 70, 90, 140: first safety member |
| 71, 81, 91, 141, 151: first conductive plate |
| 71a, 81a, 91a, 141a, 151a: first connection portion |
| 72, 82, 92, 142, 152: second conductive plate |
| 72a, 82a, 92a, 142a, 152a: second connection portion |
| 73, 83, 93, 143, 153: safety fuse |
| 74, 75, 84, 85, 94, 95, 144, 145, 154, 155: insulating film |
| 76, 86: cut-out |
| 80, 150: second safety member |
| 96: fuse opening |
| 97: connecting opening |

What is claimed is:

1. A rechargeable battery comprising:
a plurality of electrode assemblies comprising a first electrode assembly and a second electrode assembly;
a case housing the plurality of electrode assemblies;
a cap assembly coupled to the case; and
a first safety member comprising a first conductive plate between the first electrode assembly and the case, a second conductive plate between the second electrode assembly and the case, and a safety fuse between the first conductive plate and the second conductive plate and coupling the first and second conductive plates together.

2. The rechargeable battery of claim 1, wherein the case comprises a bottom opposite to the cap assembly, and the first and second electrode assemblies are spaced apart in a first direction extending toward the cap assembly from the bottom.

3. The rechargeable battery of claim 2, wherein the first and second electrode assemblies are stacked in the first direction.

4. The rechargeable battery of claim 2,
wherein the case further comprises a first frontal side extending in the first direction from the bottom and a second frontal side facing the first frontal side, and
wherein the first conductive plate is between the first frontal side and the first electrode assembly, and the second conductive plate is between the first frontal side and the second electrode assembly.

5. The rechargeable battery of claim 4, wherein the first conductive plate comprises a first connection portion coupled to the positive electrode of the first electrode assembly, and the second conductive plate comprises a second connection portion coupled to the positive electrode of the second electrode assembly.

6. The rechargeable battery of claim 5, wherein the first and second connection portions are spaced apart in the first direction.

7. The rechargeable battery of claim 4, wherein the rechargeable battery further comprises a second safety member between the second frontal side and the plurality of electrode assemblies.

8. The rechargeable battery of claim 7, wherein the second safety member comprises a first conductive plate between the second frontal side and the first electrode assembly, a second conductive plate between the second frontal side and the second electrode assembly, and a safety fuse between the first conductive plate and the second conductive plate and coupling the first and second conductive plates together.

9. The rechargeable battery of claim 2 further comprising a current collecting member coupled to the positive electrodes of the plurality of electrode assemblies, the current collecting member comprising a current collecting fuse portion having a smaller cross-sectional area than a periphery region.

10. The rechargeable battery of claim 9,
wherein the current collecting member further comprises a first adhesion portion coupled to the first electrode assembly, and a second adhesion portion coupled to the second electrode assembly, and
wherein the current collecting fuse portion is between the first and second adhesion portions.

11. The rechargeable battery of claim 9, wherein the first and second conductive plates further comprise an insulating film.

12. The rechargeable battery of claim 11, wherein the insulating film is coupled to the safety fuse.

13. The rechargeable battery of claim 2, wherein the first conductive plate, the second conductive plate, and the safety fuse are on a same plane.

14. The rechargeable battery of claim 2, wherein the safety fuse has a smaller cross-sectional area than a periphery region, and a wherein the first safety member further comprises cut-outs at each respective end of the safety fuse between the first and second conductive plates.

15. The rechargeable battery of claim 14, wherein the safety fuse is coupled to respective lateral ends of the cut-outs of the first safety member.

16. The rechargeable battery of claim 2, wherein the plurality of electrode assemblies comprises a plurality of the first electrode assemblies multi-layered in a direction perpendicular to the first direction.

17. The rechargeable battery of claim 2, wherein:
each of the first and second electrode assemblies are generally flat;
each of the first and second electrode assemblies comprises a positive electrode uncoated region at one lateral end and a negative electrode uncoated region at the other lateral end;
the first electrode assembly further comprises a first flat plane coupling the negative electrode uncoated region to the positive electrode uncoated region, and wherein the first conductive plate of the first safety member faces the first flat plane; and the second electrode assembly further comprises a second flat plane coupling the negative electrode uncoated region to the positive electrode uncoated region, and wherein the second conductive plate of the first safety member faces the second flat plane.

18. The rechargeable battery of claim 1, wherein the first electrode assembly is closer to the cap plate than the second electrode assembly.

* * * * *